(12) United States Patent
Raman

(10) Patent No.: US 10,467,683 B2
(45) Date of Patent: Nov. 5, 2019

(54) AUTOMATIC SHOPPING CART CHECKOUT

(71) Applicant: eBay Inc., San Jose, CA (US)

(72) Inventor: Srinivasan Raman, Cupertino, CA (US)

(73) Assignee: eBay Inc., San Jose, CA (US)

(*) Notice: Subject to any disclaimer, the term of this patent is extended or adjusted under 35 U.S.C. 154(b) by 228 days.

(21) Appl. No.: 15/369,266

(22) Filed: Dec. 5, 2016

(65) Prior Publication Data
US 2017/0083966 A1 Mar. 23, 2017

Related U.S. Application Data

(63) Continuation of application No. 13/585,419, filed on Aug. 14, 2012, now Pat. No. 9,514,486.

(51) Int. Cl.
*G06Q 30/00* (2012.01)
*G06Q 30/06* (2012.01)
*G06Q 20/12* (2012.01)

(52) U.S. Cl.
CPC ......... *G06Q 30/0637* (2013.01); *G06Q 20/12* (2013.01); *G06Q 20/123* (2013.01); *G06Q 30/06* (2013.01); *G06Q 30/0625* (2013.01); *G06Q 30/0633* (2013.01)

(58) Field of Classification Search
CPC .... G06Q 30/06; G06Q 30/0633; G06Q 30/00; G06Q 30/0625; G06Q 30/0637; G06Q 20/12; G06Q 20/123
See application file for complete search history.

(56) References Cited

U.S. PATENT DOCUMENTS

| | | | |
|---|---|---|---|
| 3,774,929 A | 11/1973 | Stanlay | |
| 6,873,968 B2* | 3/2005 | Ehrlich | G06Q 20/201 |
| | | | 705/20 |
| 7,225,148 B2 | 5/2007 | Kassan | |
| 7,802,200 B1 | 9/2010 | Siegel et al. | |

(Continued)

OTHER PUBLICATIONS

Jeffrey O. Kephart et al. "Shopbot Economics" Autonomous Agents and Multi-Agent Systems, 5, 255-287, © 2002 Kluwer Academic Publishers. (Year: 2002).*

(Continued)

*Primary Examiner* — Naeem U Haq
(74) *Attorney, Agent, or Firm* — Schwegman Lundberg & Woessner, P.A.

(57) ABSTRACT

An apparatus and method for purchasing contents of a virtual shopping cart are disclosed. Automatic checkout settings are received from a user, the automatic checkout settings include an automatic checkout time and an item substitution behavior setting. The user adds an item to the virtual shopping cart associated with the user. In response to the item substitution behavior authorizing substitution of items in the virtual shopping cart, availability of a substitute item that qualifies as a substitute for the item is determined. The substitute item qualifies as the substitute for the item based on the substitute item being an equivalent to the item. The item is replaced by the substitute item in the virtual shopping cart based on the availability of the substitute item. The contents of the virtual shopping cart are automatically purchased at the automatic checkout time and in accordance with remaining automatic checkout settings.

17 Claims, 8 Drawing Sheets

(56) References Cited

U.S. PATENT DOCUMENTS

| | | | |
|---|---|---|---|
| 7,890,379 B2 | 2/2011 | Kreiner et al. | |
| 8,473,370 B1 | 6/2013 | Altendorf et al. | |
| 9,514,486 B2 | 12/2016 | Raman | |
| 2003/0130897 A1 | 7/2003 | Pickover et al. | |
| 2004/0093274 A1* | 5/2004 | Vanska | G01C 21/20 705/26.7 |
| 2004/0117276 A1* | 6/2004 | Kettler, III | G06Q 10/0875 705/29 |
| 2006/0074763 A1* | 4/2006 | Schmid | G06Q 30/06 705/26.8 |
| 2006/0242011 A1* | 10/2006 | Bell | G06Q 30/02 705/14.25 |
| 2007/0239569 A1* | 10/2007 | Lucas | G06Q 10/08 705/28 |
| 2007/0271147 A1* | 11/2007 | Crespo | G06Q 30/06 705/26.2 |
| 2010/0030619 A1* | 2/2010 | Ofer | G06Q 30/02 705/14.3 |
| 2010/0030624 A1* | 2/2010 | Vanska | G01C 21/20 705/14.64 |
| 2010/0030662 A1* | 2/2010 | Klein | G06Q 30/02 705/26.1 |
| 2011/0082765 A1* | 4/2011 | Mazor | G06Q 30/00 705/26.8 |
| 2012/0215656 A1 | 8/2012 | Chen | |
| 2013/0346232 A1* | 12/2013 | Ellison | G06O 30/0631 705/26.7 |
| 2014/0046794 A1 | 2/2014 | Vallery et al. | |
| 2014/0052571 A1 | 2/2014 | Raman | |
| 2014/0214590 A1* | 7/2014 | Argue | G06O 30/0631 705/26.7 |
| 2017/0024797 A1* | 1/2017 | Ellison | G06Q 30/0631 |
| 2017/0046773 A1* | 2/2017 | Hendricks, II | G06Q 30/0635 |
| 2017/0083966 A1* | 3/2017 | Raman | G06Q 30/0633 |

OTHER PUBLICATIONS

"U.S. Appl. No. 13/585,419, Appeal Brief filed Jan. 12, 2016", 23 pgs.

"U.S. Appl. No. 13/585,419, Applicant Interview Summary filed Aug. 2, 2016", 1 pg.

"U.S. Appl. No. 13/585,419, Final Office Action dated Jul. 2, 2015", 7 pgs.

"U.S. Appl. No. 13/585,419, Non Final Office Action dated Jan. 2, 2015", 6 pgs.

"U.S. Appl. No. 13/585,419, Notice of Allowance dated Aug. 5, 2016", 13 pgs.

"U.S. Appl. No. 13/585,419, Response filed May 4, 2015 to Non Final Office Action dated Jan. 2, 2015", 12 pgs.

Gerald, L Lohse, et al., "Electronic Shopping", Communications of the ACM, vol. 41, No. 7, (Jul. 1998), 81-88.

* cited by examiner

AUTOMATIC SHOPPING CART CHECKOUT

PRIORITY

This application is a continuation of and claims the benefit of priority to U.S. patent application Ser. No. 13/585,419 filed on Aug. 14, 2012, which is hereby incorporated by reference herein in its entirety.

TECHNICAL FIELD

The present application relates generally to systems and methods for purchasing items using online shopping carts.

BACKGROUND

Electronic commerce (e-commerce) sites are configured to offer for sale one or more items and provide virtual shopping carts to facilitate purchase of such items. A user visiting an e-commerce site can place item(s) of interest into a virtual shopping cart, and proceed to a checkout process once he or she is ready to purchase the item(s) placed in the cart. The checkout process typically includes multiple steps such as providing or verifying user identity (e.g., login and password), providing shipping and billing addresses, providing a valid method of payment, confirming items for purchase, and affirmatively authorizing the purchase (e.g., clicking an "order" or "pay" button). Once the user has completed the checkout process, the e-commerce site processes the purchase order to obtain payment and ship the purchased items to the user.

If the checkout process is interrupted, incomplete, the user fails to affirmatively authorize the purchase, or the user is otherwise not ready to make a purchase at that point in time, there is no purchase of the items in the shopping cart. The contents of the particular shopping cart may be lost once the user's session with the e-commerce site is terminated. Alternatively, some e-commerce sites may provide the option to save the user's shopping cart for later access. Even if the user's shopping cart is saved for later access, if the user forgets to return to the shopping cart and complete the checkout process, there is still no purchase of the items in the shopping cart. Or the user may return too late to actually purchase the items in the shopping cart. For example, one or more of the desired items may be sold out, the price may have increased, a promotion may have ended, or any of a variety of purchasing factors may have changed from when the items were originally added to the shopping cart.

BRIEF DESCRIPTION OF THE DRAWINGS

Some embodiments are illustrated by way of example and not limitations in the figures of the accompanying drawings, in which.

The headings provided herein are for convenience only and do not necessarily affect the scope or meaning of the terms used.

DETAILED DESCRIPTION

Described in detail herein is an apparatus and method for automatic checkout of items in a virtual shopping cart. An online marketplace receives pre-set or pre-configured automatic checkout settings from a user. The automatic checkout settings include a pre-authorization from the user/buyer to purchase items in his or her online shopping cart at a scheduled time. The scheduled time comprising at least one of a specific time on a daily basis, a specific time on a weekly basis, a specific time on a monthly basis, a specific time on a particular day, a one-time specific time, a specific time on a particular periodic or non-periodic basis, and the like. For each item in the user's shopping cart, the availability status and better prices for the cart items are monitored, and suitable substitute items are sought, up to the scheduled checkout time. Thus, although the user may add items to his/her cart and then not return to the cart, the system looks out for the user's interest up to the scheduled checkout time. At the scheduled checkout time, the system automatically purchases the items in the user's cart. The automatic checkout settings are also referred to as scheduled checkout settings or scheduled auto checkout settings.

The following description is presented to enable any person skilled in the art to create and use a computer system configuration and related method and article of manufacture to receive auto checkout settings for a user, monitor the availability of better deals on the user's behalf up until the user's scheduled checkout time, update the user's cart in accordance with better deals found, and then automatically purchase the items in the user's cart at the user scheduled checkout time without further input from the user. Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
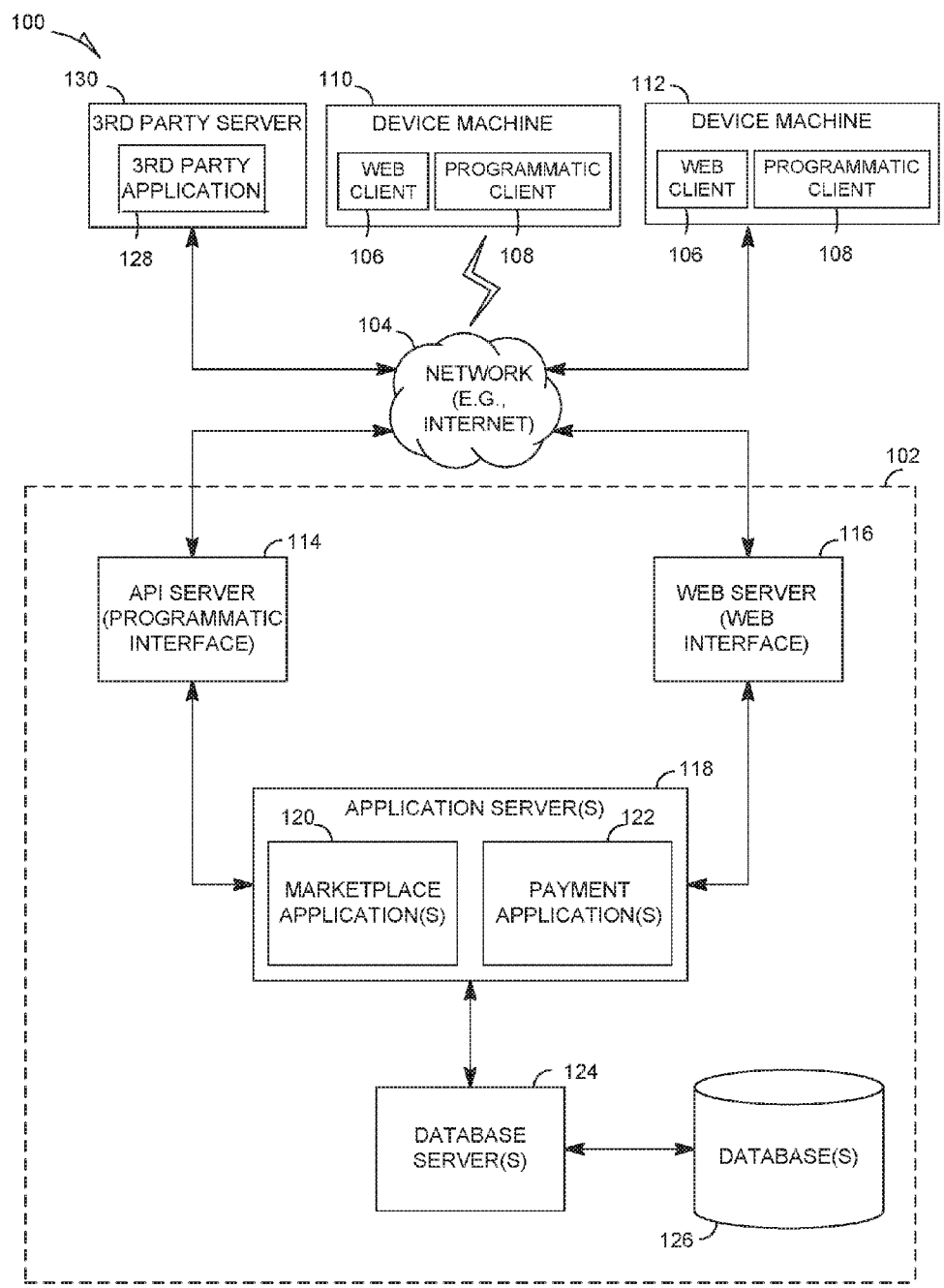
FIG. 1 illustrates a network diagram depicting an example system for providing automatic shopping cart checkout according to some embodiments.

FIG. 1 illustrates a network diagram depicting an example system 100 for facilitating checkout of item(s) in a virtual shopping cart provided by an electronic commerce (e-commerce) environment according to some embodiments. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on device machines 110 and 112. In one embodiment, the publication system 100 comprises a marketplace system. In another embodiment, the publication system 100 comprises other types of systems such as, but not limited to, a social networking system, a matching system, an electronic commerce (e-commerce) system, and the like.

Each of the device machines 110, 112 comprises a computing device that includes at least a display and communication capabilities with the network 104 to access the networked system 102. The device machines 110, 112 comprise, but are not limited to, work stations, computers, general purpose computers. Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client machines 110, 112 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the device machines 110, 112 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the device machines 110, 112, then this application is configured to locally provide the user interface and at least some of the functionalities with the application configured to communicate with the networked system 102, on an as needed basis, for data and/or processing capabilities not locally available (such as access to a database of items available for sale, to authenticate a user, to verify a method of payment, etc.). Conversely if the e-commerce site application is not included in a given one of the device machines 110, 112, the given one of the device machines 110, 112 may use its web browser to access the e-commerce site (or a variant thereof) hosted on the networked system 102. Although two device machines 110, 112 are shown in FIG. 1, more or less than two device machines can be included in the system 100.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of e-commerce functions and services to users that access networked system 102. E-commerce functions/services may include a number of publisher functions and services (e.g., search, listing, content viewing, payment, etc.). For example, the marketplace applications 120 may provide a number of services and functions to users for listing goods and/or services or offers for goods and/or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in application servers 118 or databases 126 accessible to the application servers 118 and/or the database servers 124. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the system 100. In some embodiments, at least a portion of the marketplace applications 120 may be provided on the device machines 110 and/or 112.

Further, while the system 100 shown in FIG. 1 employs a client-server architecture, embodiments of the present disclosure is not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
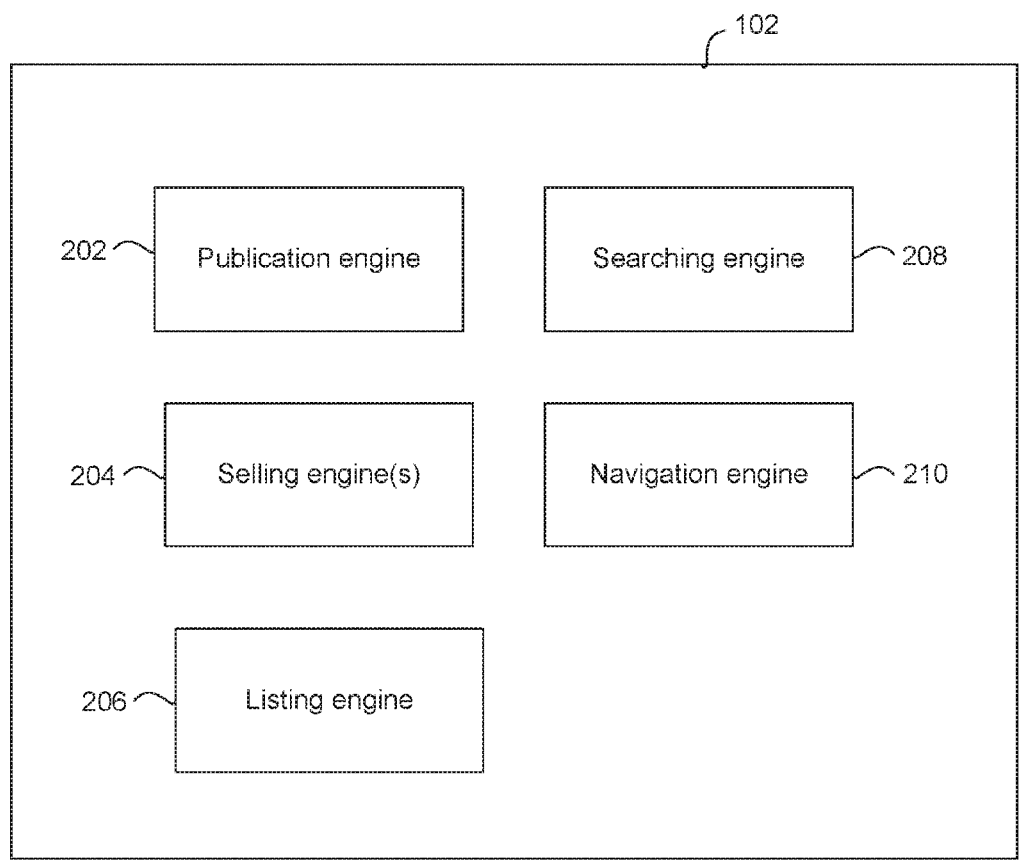
FIG. 2 illustrates a block diagram of additional details of the example system of FIG. 1 according to some embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the data servers 128.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110, 112) of the user. The searching engine 308 may record the query (e.g., keywords) and any subsequent user actions and behaviors (e.g., navigations).

The searching engine 208 also may perform a search based on the location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify as part of the search query a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

Additional modules and engines associated with the networked system 102 are described below in further detail. It should be appreciated that modules or engines may embody various aspects of the details described below.

Figure 3:
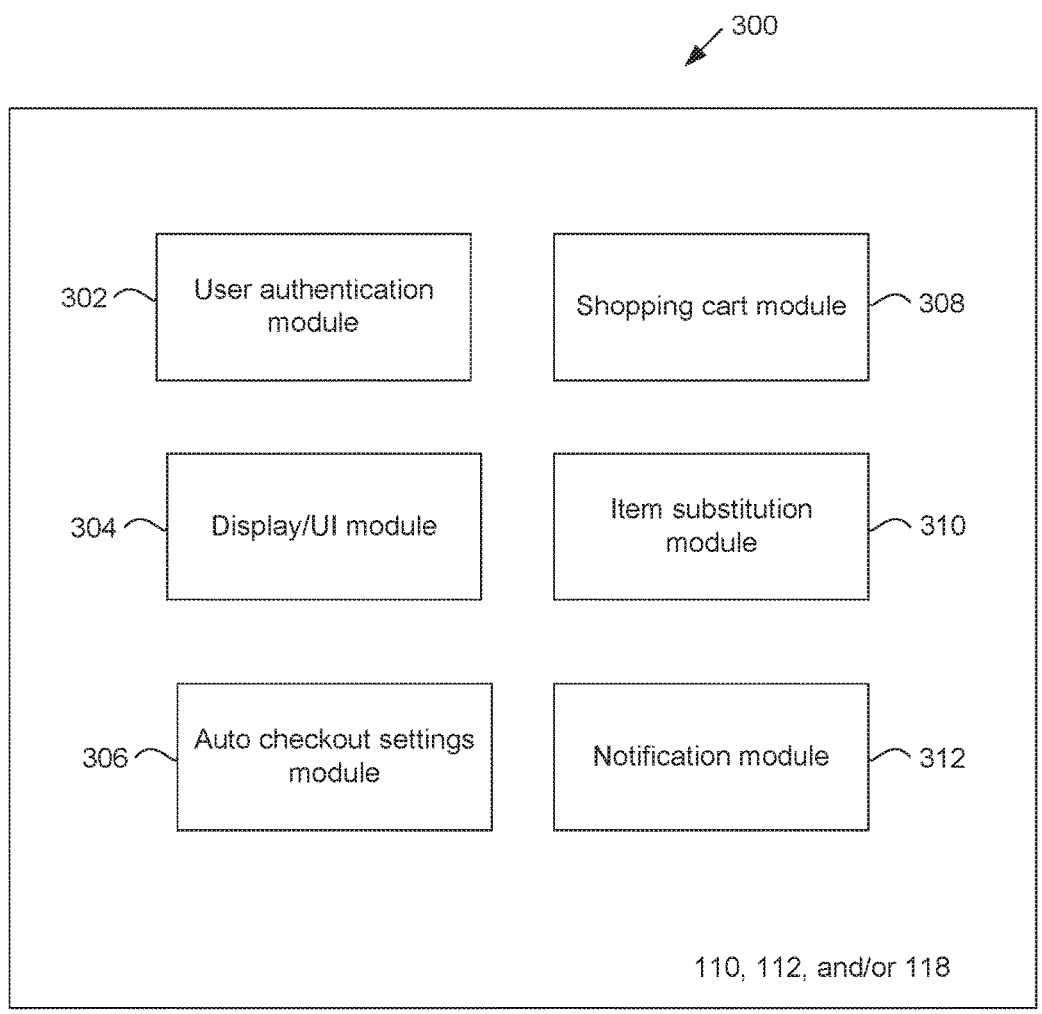
FIG. 3 illustrates a block diagram showing the checkout functionalities for a virtual or online shopping cart implemented in modules according to some embodiments.

FIG. 3 illustrates a block diagram showing the checkout functionalities for a virtual or online shopping cart implemented in modules according to some embodiments. The modules comprise one or more software components, programs, applications, apps, or other units of code base or instructions configured to be executed by one or more processors included in the application servers 118, device machine 110, and/or device machine 112 to provide the checkout functionalities or operations described herein. In some embodiments, the modules are downloaded from an e-commerce site appropriate for the type of computing device. For example, if the device machine 110 (or device machine 112) comprises an iOS-type device (e.g., iphone or the ipad), then the modules (which can be packaged as part of an e-commerce site app) can be downloaded from iTunes. Similarly, if the device machine 110 (or device machine 112) comprises an Android-type device, then the modules can be downloaded from the Android Marketplace. The device machine 110 and/or device machine 112 has communication capabilities with servers or databases at a remote location (e.g., databases 126, database servers 124, API server 114, web server 116) to access data and/or processing capabilities to facilitate shopping cart checkout to purchase the items placed in the shopping cart.

In other embodiments, the modules may be hosted on the application servers 118 and no download of the modules is required on the device machines 110, 112. Instead, the modules may be accessed by device machines 110, 112 using a web browser over the network 104. In still other embodiments, some of the modules may be included in the device machines 110, 112 while other of the modules may be included in the application servers 118; the device machines 110, 112 communicating with the application servers 118 to together provide the checkout functionalities. Although modules 300-312 are shown as distinct modules in FIG. 3, it should be understood that modules 300-312 may be implemented as fewer or more modules than illustrated. It should also be understood that any of modules 300-312 may communicate with one or more components included in the system 100, such as database servers 124, application servers 118, device machine 110, or device machine 112. The modules include a user authentication module 302, a display/user interface (UI) module 304, an auto checkout settings module 306, a shopping cart module 308, an item substitution module 310, and a notification module 312.

Figure 4A:
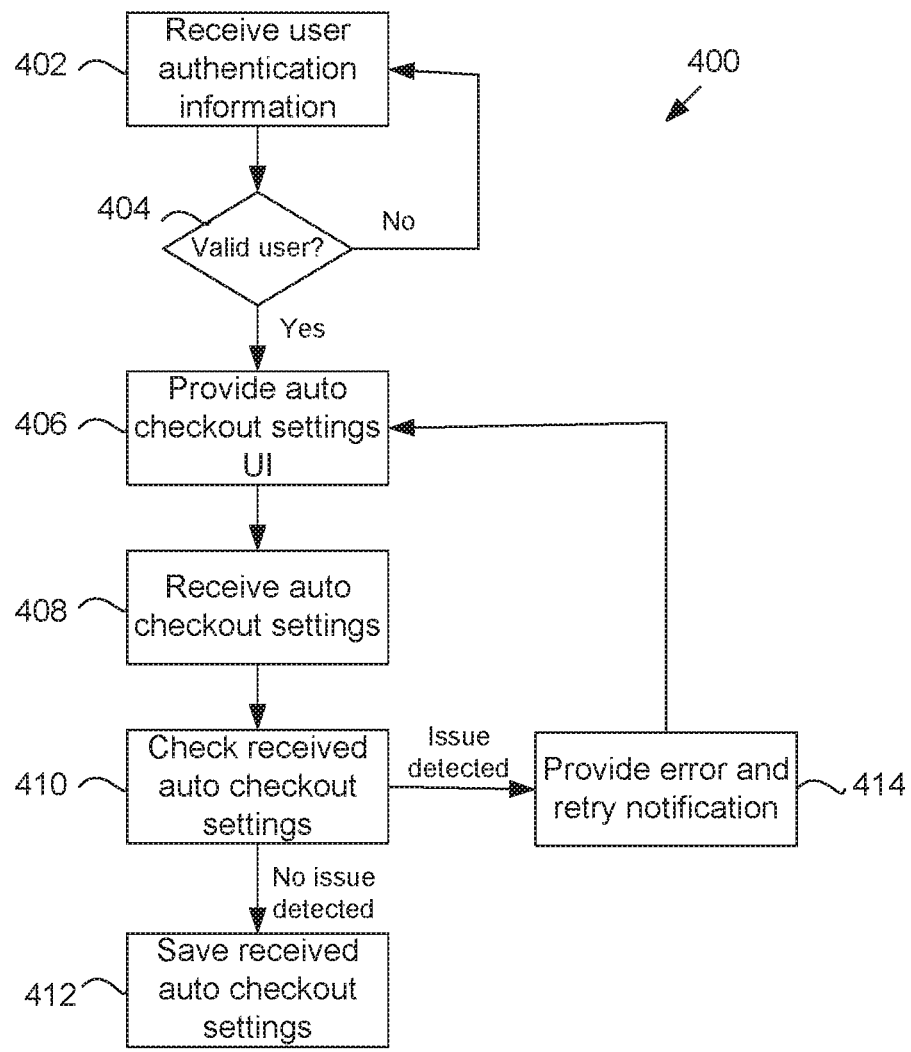
FIGS. 4A-4B respectively illustrate portions of an example flow diagram showing the shopping cart checkout functionalities or operations implemented by the modules of FIG. 3 according to some embodiments.
Figure 4B:
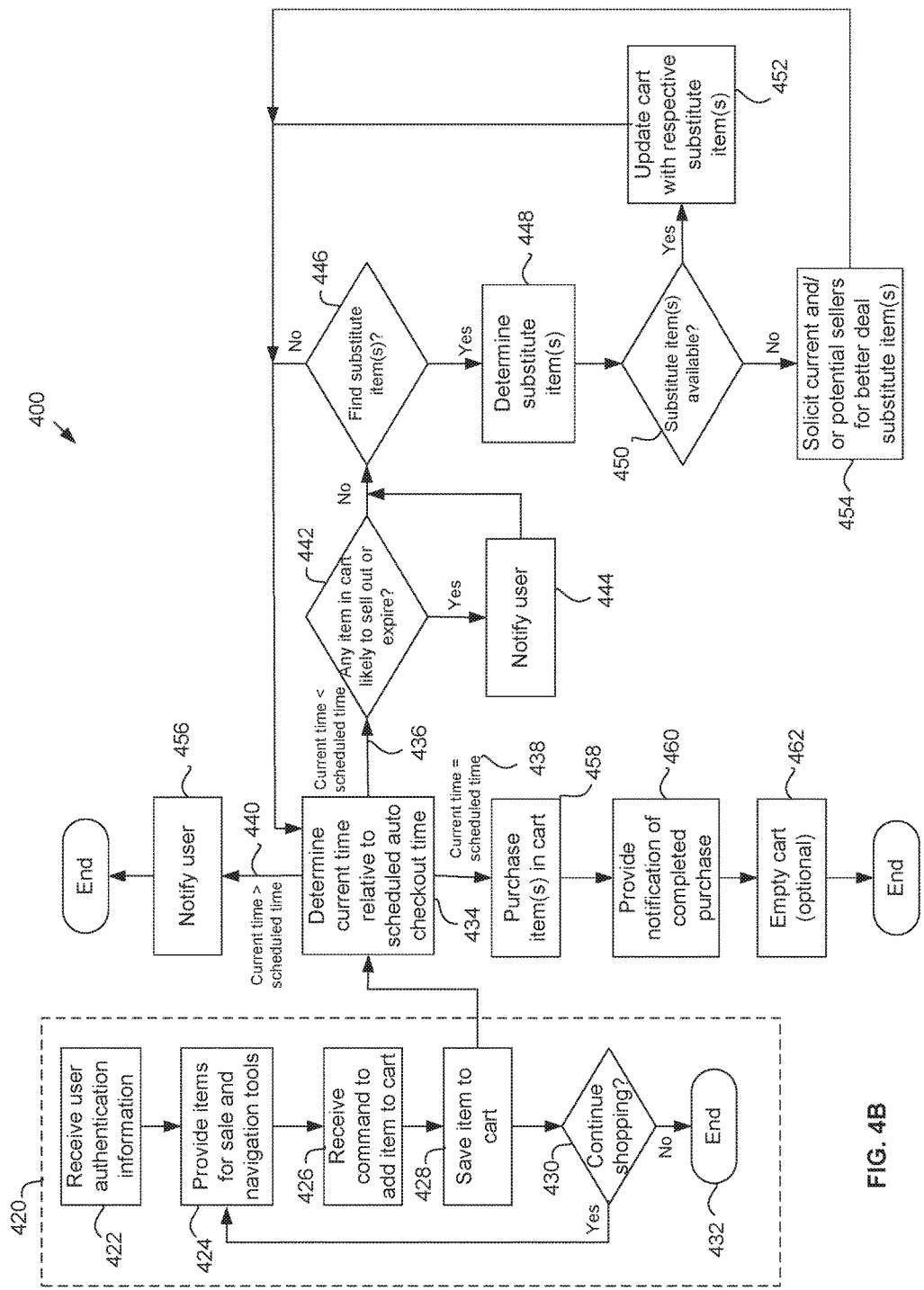
Figure 5A:
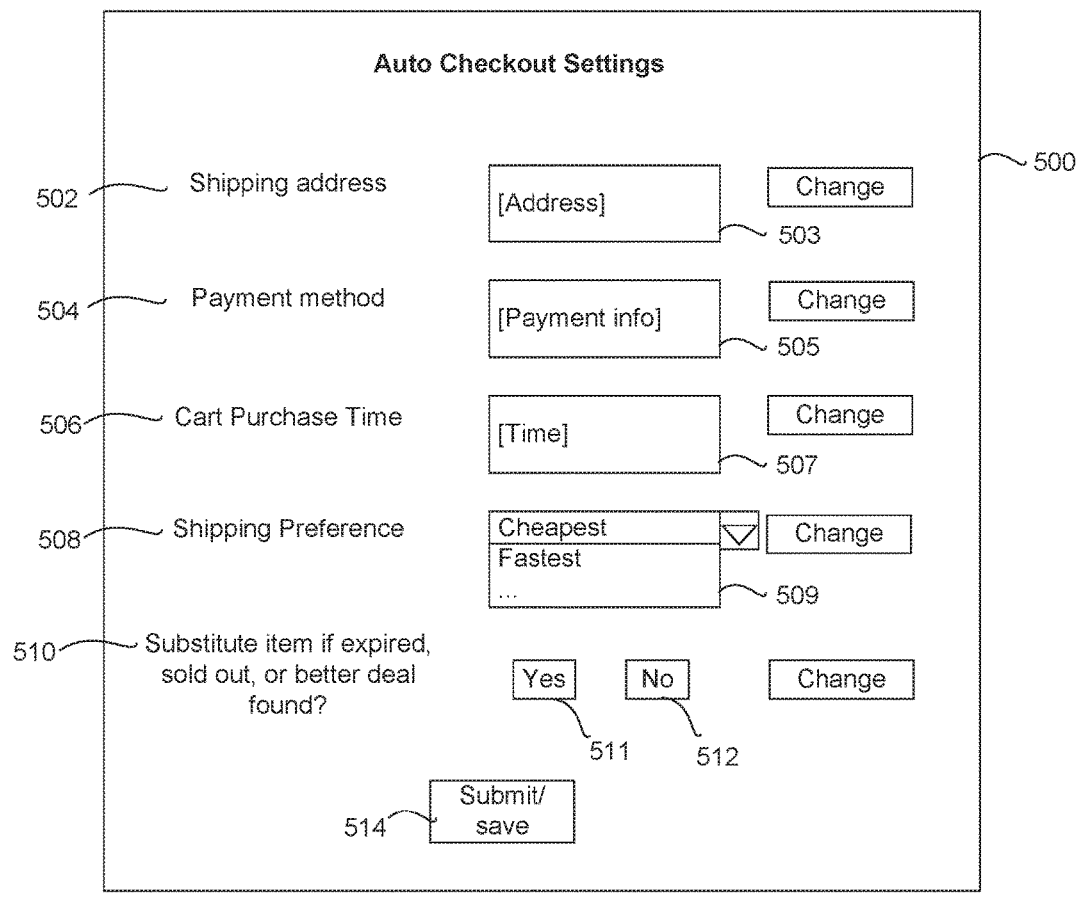
FIGS. 5A-5B illustrate example user interface (UI) screens associated with the shopping cart checkout functionalities according to some embodiments.
Figure 5B:
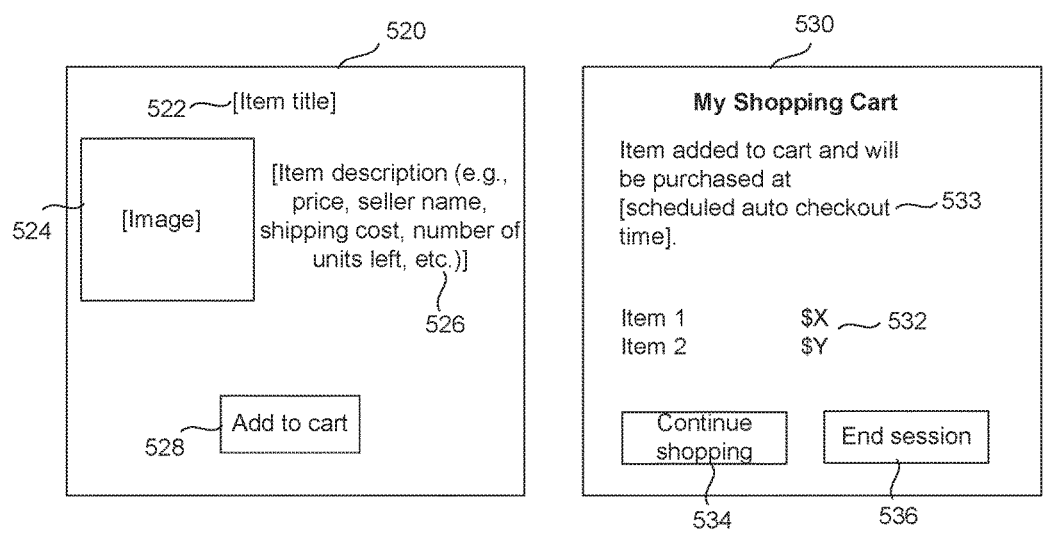

FIGS. 4A-4B respectively illustrate portions of an example flow diagram 400 showing the shopping cart checkout functionalities or operations implemented by the modules of FIG. 3 according to some embodiments. The operations of the flow diagram 400 may be performed by the device machine 110, device machine 112, and/or a server included in the networked system 102 (e.g., API server 114, web server 116, or application servers 118). FIGS. 5A-5B illustrate example user interface (UI) screens provided on the device machines 110, 112 associated with the shopping cart checkout functionalities according to some embodiments. FIGS. 3, 4A-4B and 5A-5B are described below in conjunction with each other.

Before a user (also referred to as a buyer) can purchase item(s) of interest online using automatic checkout, he or she configures auto checkout settings, as shown in FIG. 4A. At a block 402, the device machine 110 (or device machine 112) presents a login screen to receive user identity information in order to verify the user's right to configure the auto checkout settings. A server included in the networked system 102 (e.g., API server 114, web server 116, or application servers 118) can be configured to receive user authentication information from the device machine 110 or 112, such as, but not limited to, a user name and password associated with the user. A check is then performed at a block 404 against a database of user authentication information, such as database 126, by the user authentication module 302. If the inputted user authentication information does not match information stored in the database, then the user may retry entering the correct user name and password (returns to block 402).

Otherwise when the user is authenticated, the display/UI module 304 is configured to provide an auto checkout setting UI to the user. Such UI may be provided by the device machine 110 or 112 directly or via a server included in the networked system 102 (e.g., API server 114, web server 116, or application servers 118). FIG. 5A illustrates an example auto checkout setting UI/screen 500. The screen 500 includes the following information types: shipping address 502, payment method and authorization 504, cart purchase time 506, shipping preference 508, and substitute item preference 510. The screen 500 also includes the following respective input fields: shipping address field 503, payment field 505, cart purchase time field 507, shipping preference field 509, and substitute item preference icons 511 and 512. The screen 500 may additionally include icons and other indicators for the user to configure the auto checkout settings and/or navigate within the setting screen(s), such as "change" icons/buttons and "submit/save" icons/buttons.

The auto checkout settings module 306 is configured to receive auto checkout settings specified by the user on the screen 500 at a block 408. The user inputs a (default) shipping address in the shipping address field 503, and a (default) payment method and payment authorization in the payment field 505. The information provided in the payment field 505 may include not only a method of payment (e.g., credit card, debit card, PayPal, etc.) but also account information sufficient to verify the validity of the account (and in some instances, verify that the account is properly associated with the user). When using PayPal or certain other payment mechanisms, for example, verification of ownership of an account may include requesting the user to log into his/her PayPal account and authorizing one or more payments from that account.

The user also specifies a particular purchase time (also referred to as a scheduled checkout time, automatic checkout time, pre-determined checkout time) in the cart purchase time field 507, at which automatic checkout or purchase of item(s) in his or her virtual shopping cart is to take place. For instance, the purchase time may be set to 8 pm Pacific Standard Time (PST) Monday through Friday, 10 pm PST every Friday, 8 pm PST, or any other one time or reoccurring date and/or time. The purchase time is also referred to as a scheduled checkout time, a scheduled auto checkout time, a pre-determined checkout time, a scheduled purchase time, an automatic checkout time, an automatic purchase time, or other similar terms. The user may also specify shipping preferences in the shipping preference field 509, such as deciding between the cheapest shipping, fastest shipping, least number of packages, etc. In case an item added to the user's cart sells out, expires (the time to purchase ends prior to the user's set purchase time), is selling at a better price, or some other interim condition occurs after the item has been added to the cart but prior to the purchase time, the user can specify looking for substitute items by selecting the "yes" button 511 or not substituting items by selecting the "no" button 512.

If the user specifies that the system look for substitute items, then the display/UI module 304 may be configured to provide additional screen(s) to receive user input specifying the behavior that the system should perform under different conditions. For example, the user may specify that substitute items should be sought if a better deal exists, but that an expired or sold out item should not be substituted with another item. As another example, any item that expires, sells out, or is offered at a better price may be authorized to be substituted with an equivalent item. It is understood that although an item expiring, selling out, or being offered at a better price are discussed, other conditions pertaining to one or more items in a cart can also trigger substitution behavior.

Configuration of the auto checkout settings by the user also serves as the user's authorization (or pre-authorization) for the system to purchase the items in the user's cart at the user scheduled checkout time.

Once the user has specified the auto checkout settings (e.g., entered information into the fields provided in screen 500 and clicked on the "submit/save" button), the auto checkout settings module 306 is configured to check the received auto checkout settings at a block 410. Various checks may be performed such as, but not limited to, confirming that the received shipping address is a valid address, verifying the validity of the payment method and/or account, and the like. Performing one or more of the checks may require interfacing with other servers, databases, or other information sources. Checking block 410 may also be performed simultaneously with the receiving block 408—as information is received from the user, the auto checkout settings module 306 may perform checks in real- or near real-time.

If an issue is detected from the check(s) performed in block 410, the display/UI module 304 is configured to provide an error notification to the user (block 414) and the user may be instructed to retry inputting the auto checkout settings on screen 500 (returns to block 406). Otherwise if no issue is detected in block 410, then the received auto checkout settings are saved at a block 412. The auto checkout settings may be stored in a database such as database 126.

Although not shown, the user is permitted to update or change his or her auto checkout settings. For example, the user may login again and proceed to change previously provided settings using the "change" button/icon next to respective input fields in screen 500.

FIG. 4B illustrates portions of the flow diagram 400 pertaining to populating a virtual or online shopping cart and the automatic checkout of item(s) in the cart according to some embodiments. At a block 422, the user authentication module 302 is configured to receive authentication information from a user (e.g., the same user that specified the auto checkout settings discussed with respect to FIG. 4A) at the device machine 110 or 112. Authentication information can comprise a user name and a password associated with the user. The user provided information can be checked by a server included in the networked system 102 to verify the user information.

Once the user's identity has been verified, the display/UI module 304 is configured to provide one or more pages (or e-commerce site(s) or online marketplace) offering for sale products and services (collectively referred to as items) on the device machine 110 or 112 (block 424). The display/UI module 304 may work in conjunction with the selling engine(s) 204 and/or the navigation engine 210 (see FIG. 2) to provide information associated with items offered for sale (e.g., price, detailed description, photos, expiration time, seller identity, etc.), and navigation tools to navigate among the item offerings and to add, delete, or update item(s) to a shopping cart for online purchase. In one embodiment, the items are offered for sale at fixed prices (at least up to an expiration time specified for respective items), and the items may be offered for sale by one or more sellers. The user navigates among the items offered for sale until he/she finds an item desirous of purchasing.

The shopping cart module 308 then receives a user command to add a particular item to his/her shopping cart at a block 426. FIG. 5B shows an item description screen 520 from which the user can add the item to his/her cart. The screen 520 includes an item title 522, item image 524, item description (including the price, seller name, shipping and handling charges, etc.) 526, and an "add to cart" icon/button 528. When the user actuates the "add to cart" icon/button 528, a shopping cart screen 530 is provided to the user. The shopping cart screen 530 includes a summary of all items currently in the user's cart (listing 532) and (optionally) a reminder of the scheduled auto checkout time (reminder 533). The user has the option to continue shopping (via the "continue shopping" icon/button 534) or end the current shopping session (via the "end session" icon/button 536). The item added to the cart is associated with the user and is saved for later access (including the automatic checkout described below). If the user indicates a desire to continue shopping (block 430), then the display/UI module 304 is configured to continue providing UI screens associated with items available for purchase (returns to block 424). Otherwise if the user indicates that he/she has completed shopping or there is no activity from the user for a certain period of time, the current shopping session is ended at a block 432.

It is contemplated that the user authentication block 422 can occur anytime prior to or simultaneous with the saving block 428. Blocks 422-432 (collectively referred to as the adding item(s) to a cart blocks 420) is performed in the same or different session from blocks 434-462. The user may add or update item(s) in the cart in one or more sessions. One or more of blocks 422-432 can also occur simultaneously with one or more of blocks 434-462. These and other variations in the performance of the flow diagram 400 are within the scope of embodiments of the present disclosure.

Once at least one item is saved in the user's cart, the networked system 102 is configured to (continually or periodically) analyze the items in the user's cart in accordance with the user-specified auto checkout settings until auto checkout is completed. At a block 434, the shopping cart module 308 is configured to determine the current time in comparison to the scheduled auto checkout time. The current time may be earlier than the scheduled auto checkout time (branch 436), the current time may be the same as the scheduled auto checkout time (branch 438), or the current time may be later than the scheduled auto checkout time (branch 440).

When the current time is earlier than the scheduled auto checkout time (branch 436), the sell out or expiration potential of each item in the cart is determined at a block 442 by the item substitution module 310. If any item is likely to sell out or expire, then the notification module 312 is configured to provide a notification of such status to the user at a block 444. The notification may be a text message, email, or other common forms of communication. After notifying the user or if no item is likely to sell out or expire, the item substitution module 310 is configured to determine if substitute item(s) should be found for item(s) in the user's cart (block 446). The item substitution module 310 may coordinate with the auto checkout settings module 306 and/or a database containing the user's auto checkout settings (e.g., database 126) to obtain the user's directive regarding substitute items. If the user specified that no items in his/her cart should be substituted with another item, then the networked system 102 returns to block 434 to continue monitoring the current time relative to the scheduled auto checkout time.

If the user specified finding substitute items, then the item substitution module 310 is configured to determine the availability of a suitable substitute item for each item in the user's cart (block 448). In some embodiments or if the user explicitly authorized it, the item substitution module 310 searches for substitutes of a given cart item even if there is no risk of that item selling out or expiring. Substitutes may be desirable if an equivalent item exists at a better price.

In order for an item in the user's cart to be substituted with another item, the cart item should be a new item and uniquely (and definitively) identifiable by the networked system 102. The networked system 102 maintains a database or catalog of uniquely identified items, wherein detailed information about each item in the catalog includes information such as photos, dimensions, specification, manufacturer, model number, and other information about the item. Such catalog can comprise thousands or millions of uniquely identified items. The catalog can be compiled by crawling the web to extract item information. For each item submitted for sale to the networked system 102, the networked system 102 attempts to uniquely identify that item using the existing catalog of uniquely identified items (e.g., the item submitted for sale is catalog item #20,567). For example, if a seller submits product information comprising a new black iPad2 WiFi model with 16 GB of memory, this item can be uniquely identified using the catalog. The networked system 102 definitively knows what this item is. On the other hand, if a seller submits product information comprising a used black iPad2 WiFi model with 16 GB of memory, even if it is reported as being in excellent condition, the networked system 102 cannot uniquely identify this item because the networked system 102 cannot verify the item's used condition.

For each item in the user's cart that has been uniquely identified, the item substitution module 310 searches for at least one equivalent item that is available for sale by the networked system 102 and which is a better deal than the current item in the user's cart. An equivalent item is thus an item that is also new and uniquely identified as being the same catalog item as the item in the user's cart (e.g., identical in color, size, accessories, amount of memory, model number, specification, etc.). In order to determine whether an equivalent item is a better deal than the item in the user's cart, the total price of the equivalent item and cart item are compared. The total price of an item includes the item price, shipping and handling cost, sales, tax, discounts, and all other costs, fees, and promotions associated with purchase of the item. For example, if a first seller offers a certain discount for purchasing more than one item in the same order, this is taken into account if the potential substitute item is being offered by a different (second) seller so that the user's cart will no longer include multiple items from the first seller with the substitution.

At blocks 450 and 452, if one or more substitute item(s) for respective cart item(s) is found, the item substitution module 310 and shopping cart module 308 facilitates updating the user's cart with the substitute item(s). Then the flow diagram 400 returns to block 434 to monitor whether it is time to purchase the items in the user's cart. Otherwise, if no substitute item(s) are found (block 450), the item substitution module 310 and/or the notification module 312 is configured to solicit one or more existing sellers of equivalent items to offer their items at better overall prices than item(s) in the user's cart. The solicitation may also include requesting potential sellers to offer equivalent item(s) at a better deal than item(s) in the user's cart. Then the flow diagram 400 returns to block 434 to monitor for checkout time.

Returning to block 434 and branch 440, if the current time is past the scheduled auto checkout time, then the notification module 312 is configured to notify the user that items in the shopping cart will be automatically purchased at the next purchase periodicity specified in the scheduled auto checkout time. For example, the current time is 9 PM on a Tuesday and the scheduled auto checkout time is every weekday at 8 PM; thus the cart items will be automatically purchased the next day (Wednesday) at 8 PM. Alternatively, if the scheduled auto checkout time is set for one time or a finite number of times so that no more auto checkouts are authorized by the user, then the notification module 312 is configured to notify the user to update the scheduled auto checkout time at a block 456. As another alternative, block 456 may be optional, for instance, when the auto checkout time specifies a purchase periodicity.

Lastly, if the current time is the same as the scheduled auto checkout time at block 434 and branch 438, then the shopping cart module 308 automatically purchases all the items in the user's cart at a block 458. The user can forget about manually performing checkout of items in his/her cart. Instead, the shopping cart module 308 is configured to checkout the items in the user's cart in accordance with auto checkout settings previously configured by the user. Next at a block 460, the notification module 310 provides notification to the user that the purchase has been completed. If there are any items in the cart that could not be purchased at the scheduled checkout time because, for example, it is out of stock and no substitute could be found, then those items may be removed from the cart at a block 462. Alternatively such items may remain in the cart for the user to address at a later point in time.

In this manner, a user can add one or more items to a virtual shopping cart provided by an online marketplace or e-commerce site (in one or more shopping sessions), and then the online marketplace takes care of the rest of the purchasing process. Based on pre-set or pre-configured auto checkout settings specified by the user (e.g., shipping address, scheduled auto checkout time, payment method, payment authorization, shipping preference, item substitution behavior), the online marketplace looks out for the user's best interest up to and until the pre-set auto checkout time. For each item placed in the user's cart, the online marketplace checks the availability of the item for purchase and/or checks for a better deal until the pre-set auto checkout time. Checking for a better deal includes searching for an item that is equivalent to a given cart item that is being offered in the online marketplace at a better overall price. Checking for a better deal may also include soliciting current or potential sellers to offer for sale an item equivalent to a given cart item at a better overall price than the item current in the cart. Then at the user specified purchase time, the items in the user's cart are automatically purchased without the user having to return to his/her shopping cart to complete purchase of the items.

Automatic checkout of a virtual shopping cart is beneficial for buyers that purchase items on a consistent or repeated basis. Instead of having to place multiple orders throughout the day, for example, or having to remember to return to items saved in a shopping cart and complete checkout, the user merely places desired items in his/her shopping cart and then can forget about the rest. The system automatically monitors availability and best price for each item in the cart until the pre-set purchase time.

Figure 6:
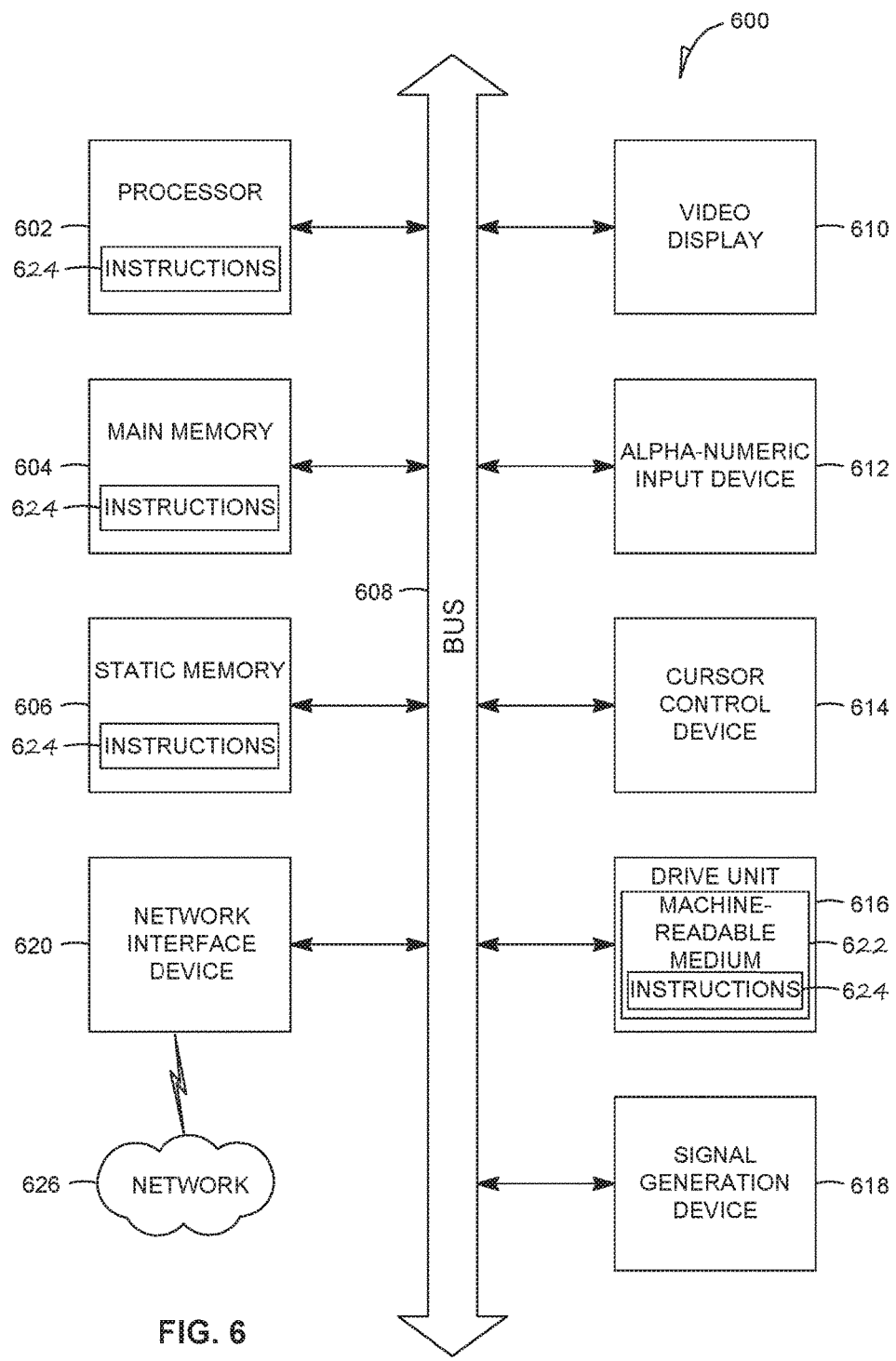
FIG. 6 illustrates a diagrammatic representation of a machine in the example form of a computer system within which a set of instructions, for causing the machine to perform any one or more of the methodologies of FIG. 3, 4A-4B, or 5A-5B according to some embodiments.

FIG. 6 shows a diagrammatic representation of a machine in the example form of a computer system 600 within which a set of instructions, for causing the machine to perform any one or more of the methodologies discussed herein, may be executed. The computer system 600 comprises, for example, any of the device machine 110, device machine 112, applications servers 118, API server 114, web server 116, database servers 124, or third party server 130. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystal display (LCD), organic light emitting diode (OLED), touch screen, or a cathode ray tube (CRT)). The computer system 600 also includes an alphanumeric input device 612 (e.g., a physical or virtual keyboard), a cursor control device 614 (e.g., a mouse, a touch screen, a touchpad, a trackball, a trackpad), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    detecting, by a processor of a networked system, an item in a virtual shopping cart of a user, the detecting automatically triggering the networked system to analyze the item in the virtual shopping cart in accordance with user-specified automatic checkout settings, the user-specified automatic checkout settings comprising an authorization from the user to, automatically and without human intervention, purchase items in the virtual shopping cart at an automatic checkout time;
    in response to the detecting, analyzing, by the networked system, content of the virtual shopping cart in accordance with the user-specified automatic checkout settings of the user, the analyzing comprising, in response to an item substitution behavior setting that authorizes substitution of the item in the virtual shopping cart based on the item selling out or expiring prior to the automatic checkout time, determining availability of a substitute item for the item in the virtual shopping cart;
    based on the availability of the substitute item, updating, by the networked system, the virtual shopping cart by replacing the item with the substitute item; and
    automatically, without human intervention, purchasing, by the networked system, the content of the virtual shopping cart in accordance with the automatic checkout time indicated in the automatic checkout settings.

2. The method of claim 1, further comprising monitoring the content of the virtual shopping cart for status and better prices until the automatic checkout time indicated in the automatic checkout settings.

3. The method of claim 1, further comprising:
    providing an automatic checkout setting user interface (UI) to a device of the user; and
    receiving the automatic checkout time and the substitution behavior setting via the automatic checkout setting UI.

4. The method of claim 1, wherein the substitution behavior setting indicates whether to look for the substitute item based on the item selling at a better price than when the item was added to the virtual shopping cart.

5. The method of claim 1, wherein configuration of the automatic checkout settings by the user serves as the authorization for the networked system to automatically purchase the content of the virtual shopping cart at the automatic checkout time.

6. The method of claim 1, further comprising determining a sell out or expiration potential of each item in the virtual shopping cart.

7. The method of claim 1, further comprising based on one item in the virtual shopping cart being likely to sell out or expire, providing a notification of the sell out or expiration potential to a device of the user.

8. A system comprising:
    one or more hardware processors; and
    a storage device storing instructions that, when executed by the one or more hardware processors, causes the one or more hardware processors to perform operations comprising:
        detecting an item in a virtual shopping cart of a user, the detecting automatically triggering the system to analyze the item in the virtual shopping cart in accordance with user-specified automatic checkout settings, the user-specified automatic checkout settings comprising an authorization from the user to, automatically and without human intervention, purchase the item in the virtual shopping cart at an automatic checkout time;
        in response to the detecting, analyzing content of the virtual shopping cart in accordance with the user-specified automatic checkout settings of the user, the analyzing comprising, in response to an item substitution behavior setting that authorizes substitution of the item in the virtual shopping cart based on the item selling out or expiring prior to the automatic checkout time, determining availability of a substitute item for the item in the virtual shopping cart;
        based on the availability of the substitute item, updating the virtual shopping cart by replacing the item with the substitute item; and
        automatically, without human intervention, purchasing the content of the virtual shopping cart in accordance with the automatic checkout time indicated in the automatic checkout settings.

9. The system of claim 8, wherein the operations further comprise monitoring the content of the virtual shopping cart for status and better prices until the automatic checkout time indicated in the automatic checkout settings.

10. The system of claim 8, wherein the operations further comprise:
    providing an automatic checkout setting user interface (II) to a device of the user; and
    receiving the automatic checkout time and the substitution behavior setting via the automatic checkout setting UI.

11. The system of claim 8, wherein the substitution behavior setting indicates whether to look for the substitute item based on the item selling at a better price than when the item was added to the virtual shopping cart.

12. A method comprising:
    detecting, by a processor of a networked system, an item in a virtual shopping cart of a user, the detecting automatically triggering the networked system to analyze the item in the virtual shopping cart in accordance with user-specified automatic checkout settings, the user-specified automatic checkout settings comprising an authorization from the user to, automatically and without human intervention, purchase items in the virtual shopping cart at an automatic checkout time;

in response to the detecting, analyzing content of the virtual shopping cart in accordance with user-specified automatic checkout settings of the user, the analyzing comprising, in response to an item substitution behavior setting that authorizes substitution of items in the virtual shopping cart, determining availability of a substitute item for the item in the virtual shopping cart;

based on unavailability of the substitute item at a better price, soliciting a seller of an equivalent item to offer the equivalent item at a better overall price than the item in the virtual shopping cart; and automatically, without human intervention, purchasing the content of the virtual shopping cart in accordance with the automatic checkout time indicated in the automatic checkout settings.

13. The method of claim 12, further comprising monitoring the content of the virtual shopping cart for status and better prices until the automatic checkout time indicated in the automatic checkout settings.

14. The method of claim 12, further comprising:
providing an automatic checkout setting user interface (UI) to a device of the user; and
receiving the automatic checkout time and the substitution behavior setting via the automatic checkout setting UI.

15. The method of claim 12, wherein the substitution behavior setting indicates whether to look for the substitute item based on the item selling out, expiring prior to the automatic checkout time, or selling at a better price than when the item was added to the virtual shopping cart.

16. The method of claim 12, wherein configuration of the automatic checkout settings by the user serves as the authorization for the networked system to automatically purchase the content of the virtual shopping cart at the automatic checkout time.

17. The method of claim 12, further comprising:
determining a sell out or expiration potential of each item in the virtual shopping cart; and
based on one item in the virtual shopping cart being likely to sell out or expire, providing a notification of the sell out or expiration potential to a device of the user.

* * * * *

UNITED STATES PATENT AND TRADEMARK OFFICE
CERTIFICATE OF CORRECTION

PATENT NO. : 10,467,683 B2  
APPLICATION NO. : 15/369266  
DATED : November 5, 2019  
INVENTOR(S) : Srinivasan Raman Page 1 of 1

It is certified that error appears in the above-identified patent and that said Letters Patent is hereby corrected as shown below:

In the Claims

In Column 16, Line 15, in Claim 7, delete "claim 1," and insert -- claim 6, --, therefor.

In Column 16, Line 56, in Claim 10, delete "(II)" and insert -- (UI) --, therefor.

Signed and Sealed this  
Twenty-first Day of July, 2020

Andrei Iancu  
*Director of the United States Patent and Trademark Office*